C. FLÖSSEL
GAS PURIFIER.
APPLICATION FILED FEB. 25, 1909.
1,053,982.
Patented Feb. 25, 1913.
4 SHEETS—SHEET 1.
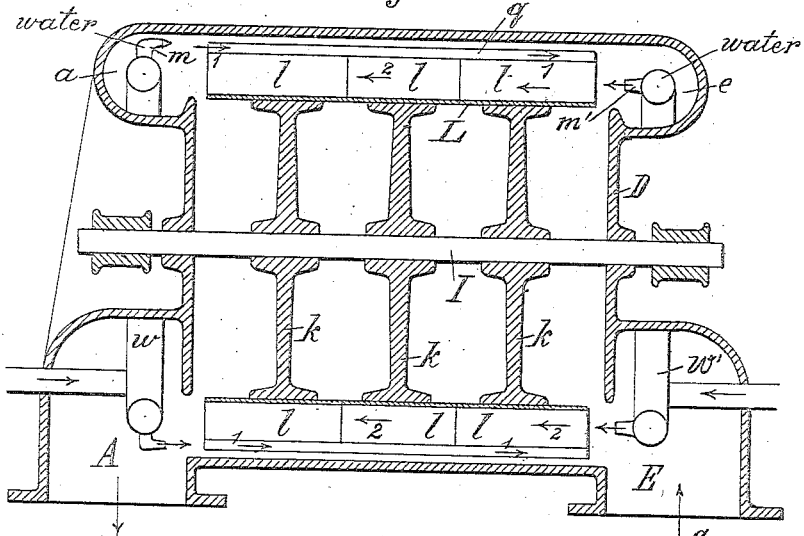
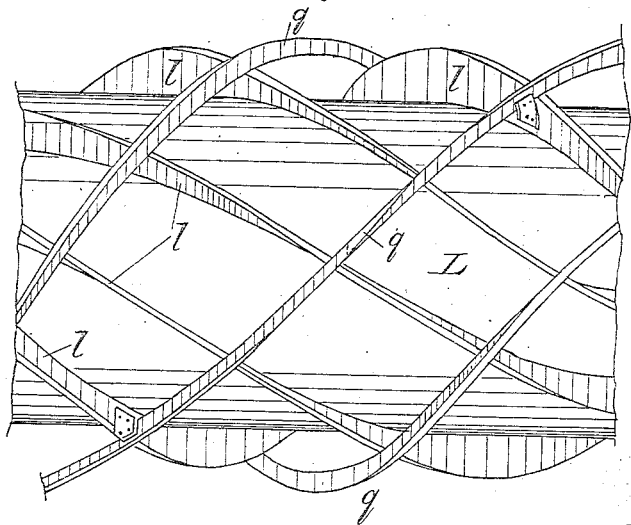
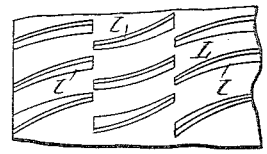
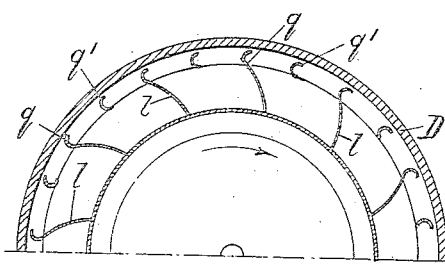
Witnesses:
Inventor:
Carl Flössel

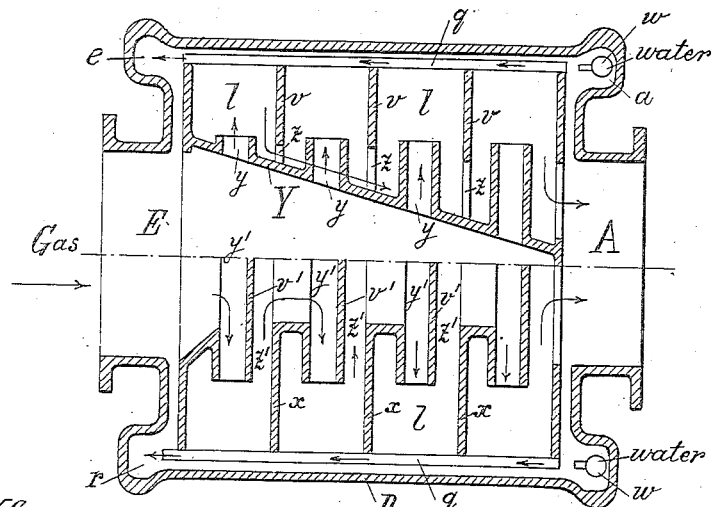
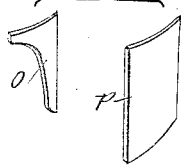
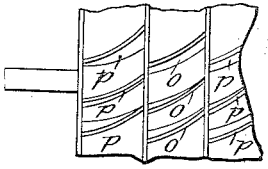
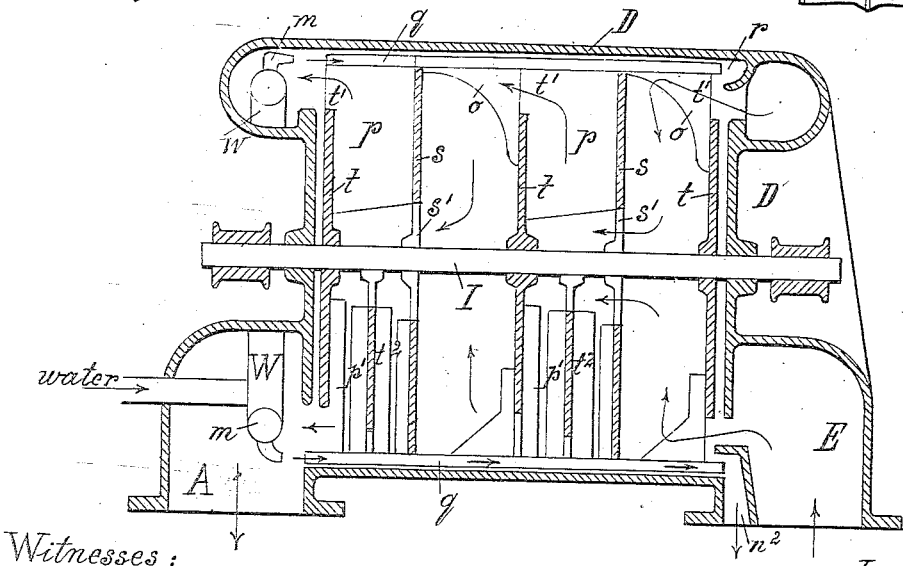

C. FLÖSSEL.
GAS PURIFIER.
APPLICATION FILED FEB. 25, 1909.
1,053,982.
Patented Feb. 25, 1913.
4 SHEETS—SHEET 3.
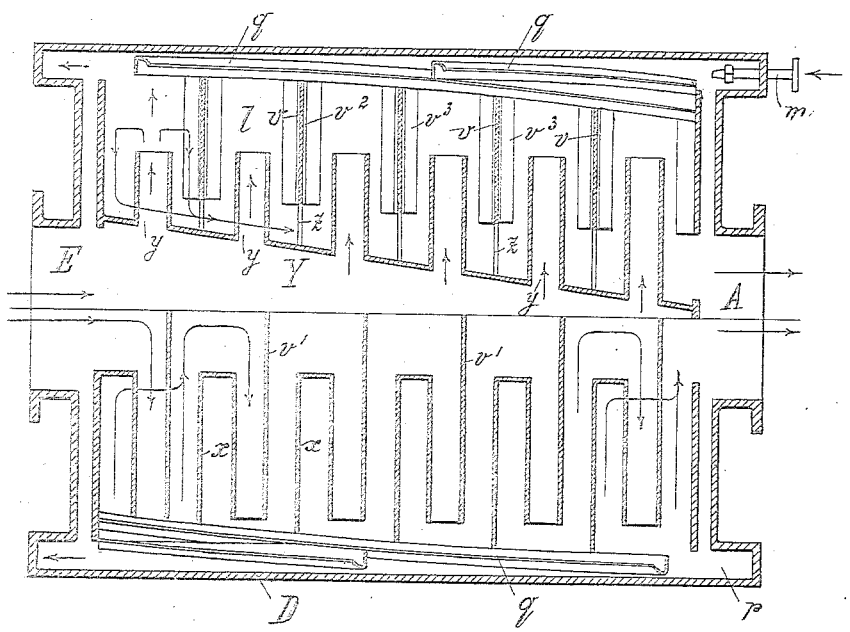
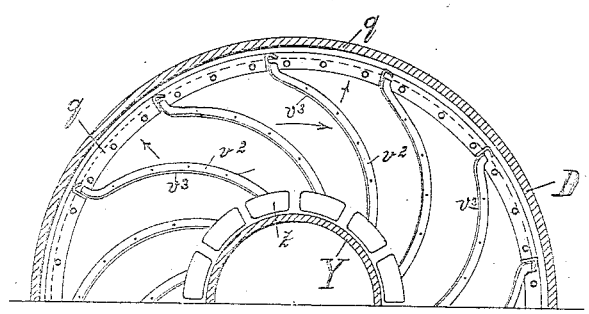

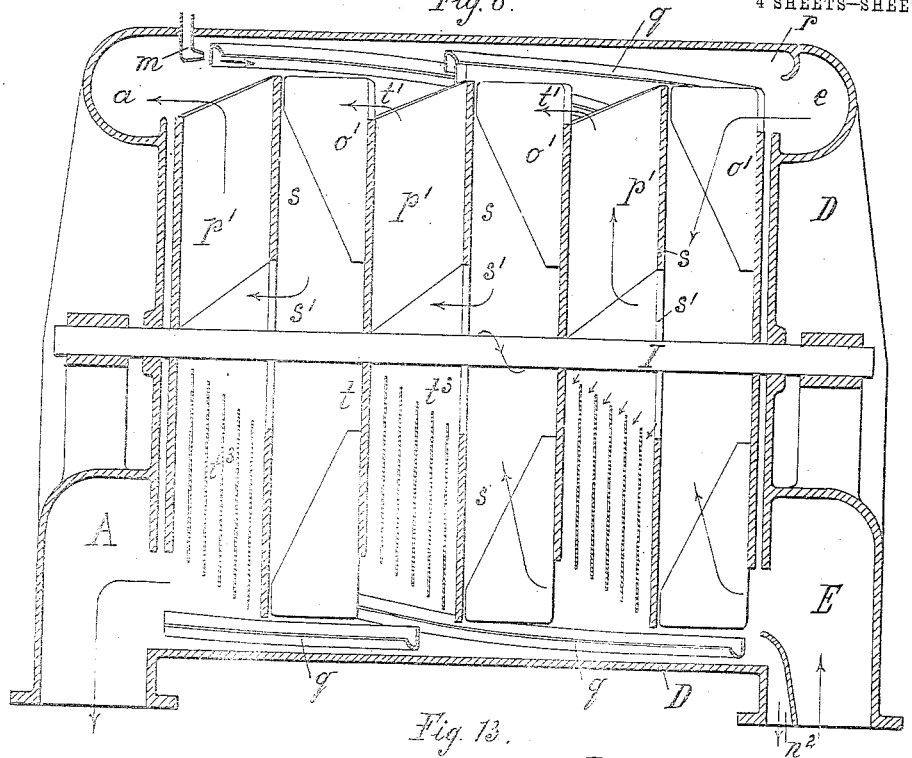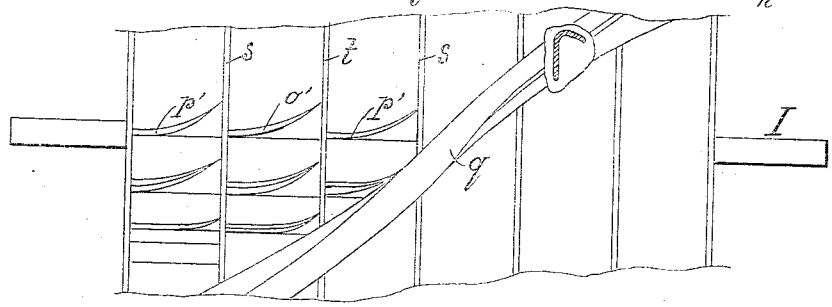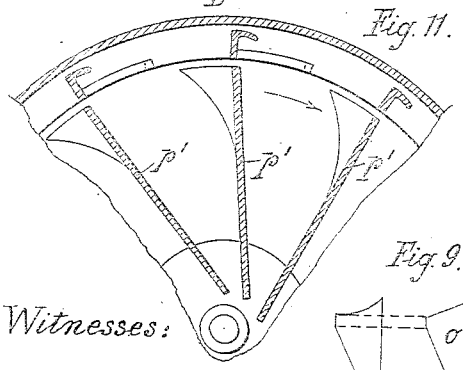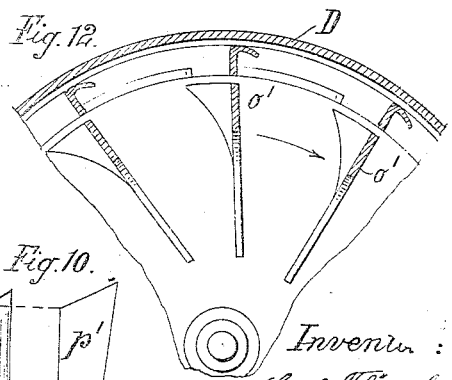

UNITED STATES PATENT OFFICE.

CARL FLÖSSEL, OF MUNICH, GERMANY.

GAS-PURIFIER.

1,053,982.

Specification of Letters Patent.

Patented Feb. 25, 1913.

Application filed February 25, 1909. Serial No. 479,998.

*To all whom it may concern:*

Be it known that I, CARL FLÖSSEL, citizen of Germany, residing at Munich, Kingdom of Bavaria, in the Empire of Germany, have invented certain new and useful Improvements in Gas-Purifiers; and I do hereby declare the following to be a full, clear, and exact description of the invention, such as will enable others skilled in the art to which it appertains to make and use the same.

This invention relates to rotary or centrifugal gas purifiers and, more in particular, to axial gas purifiers, that is to say, purifying apparatus in which the general direction of travel of the gases to be cleaned, such as gases from blast furnaces and other products of combustion issuing from furnaces, kilns, and the like, is longitudinal or parallel to the axis of the purifier drum, as contradistinguished from radial.

It is the object of this invention to reduce the amount of power required to drive such purifiers with relation to the output, and also the amount of water or wash-liquid consumed in the cleaning operation.

Another object of the invention is to utilize a portion of the kinetic energy of the gases as they pass through the purifier to drive the apparatus and to separate the impurities as they are precipitated out of the gas and to compel them to travel in a direction substantially opposite to the general path of the gases and, moreover, to arrange the means for this purpose so as to consume a minimum quantity of energy.

In realizing these aims my invention comprises vanes having such a curvature or inclination with respect to the axis as to feed the gases forward and in combination with these, exterior or peripheral vanes having an opposite curvature or slope and rigidly secured with respect to the first set of inner vanes. These latter vanes, being arranged at the periphery of the drum, that is to say at the portion where, by virtue of the centrifugal action, the heavier particles of impurities collect, and which I briefly denominate the outer dust zone of the apparatus, will serve to effectually separate these impurities and they require a relatively restricted area, which means a considerable saving in power for this purpose. These separators I have found to work so effectively that in some cases the injection of water into this dust-zone can be dispensed with, although I find the same of advantage in many cases. Under all circumstances the arrangement enables me to reduce the amount of water required very substantially.

My invention moreover, comprises details of construction and combinations of parts, designed to simplify and cheapen the manufacture of the purifying apparatus.

In the accompanying drawings I have represented several forms of apparatus for carrying out my invention in its preferred form.

In these drawings—Figure 1 represents a longitudinal central section of purifier; Fig. 1ª a detail plan view of same; Fig. 2 a detail view in elevation showing a somewhat modified form of blades; Fig. 3 a transverse vertical section, somewhat modified; Figs. 4 and 5 longitudinally central sections, each showing two further modifications; Figs. 5ª and 5ᵇ detail views in perspective and plan, respectively, of the upper modification shown in Fig. 5; Fig. 6 a longitudinal central section showing two further modifications; Fig. 7 a transverse vertical section of the modification shown in the upper part of Fig. 6; Fig. 8 a longitudinal central section showing two further modifications; Figs. 9, 10, 11, 12 and 13 detail views thereof.

Turning now to Figs. 1, 2 and 3, it will be seen that the inlet for the gases to be purified is at E, at the bottom of one end of the drum or casing D, and the outlet, A, at the bottom of the opposite end. The gas, on its entry into the casing and before its exit, passes through annular chambers, $e$ and $a$, within which are arranged annularly disposed nozzles $m$, $m^1$, for injecting or spraying the water or other wash-liquid longitudinally into the casing, said nozzles forming part of the water injecting devices $w$, $w^1$, here in the form of annular tubes perforated at intervals to form a series of water injectors. The nozzles, $m^1$, it will be noted, are nearer to the center or axis of the purifier than the nozzles, $m$, for a purpose to be explained below. On the rotary shaft, I, are mounted a number of disks or other supports, $k$, $k$, $k$, supporting a sheet-metal cylinder or mantle L, on the peripheries of which are mounted the vanes or blades, $l$, which may be continuous helical blades, as shown in Fig. 2, or discontinuous, the adjoining blades being set back with relation to each other so as to leave a space between them, the adjoining blades being, moreover, curved in opposite directions, as shown in Fig. 1ª, for a purpose more particularly set forth in my Patent No. 926647, dated June 29, 1909. These vanes, $l$, beside the longitudinal curvature, may advantageously, but not necessarily, have a curvature also in a radial direction, as shown in Fig. 3, their outer edges being moreover preferably, but not necessarily, bent over in the direction of rotation, so as to prevent the water deposited on them from being thrown against the walls of the casing under the action of the centrifugal force. Besides these blades or vanes, $l$, there are arranged on the periphery a series of blades or vanes, $q$, which are of such a width that they lie only in the outer dust-zone of the drum. These blades or vanes, $q$, as best shown in Fig. 2, are of such a curvature that they move the matter accumulating in the narrow outer dust-zone in the direction of the arrows, 1, Fig. 1, that is to say, in a direction substantially opposite to the course of the gases, indicated by arrows, 2, Fig. 1, the forward movement of said gases being promoted by the vanes or blades, $l$. As indicated in Fig. 3, additional blades or vanes, $q^1$ may be arranged at intermediate points between the blades, $q$.

This apparatus operates as follows: The gases to be washed enter at E and then pass in an annular stream between the vanes, $l$, toward the outlet, A, as indicated by arrows in Fig. 1. As they issue from the annular chamber, $c$, they are mixed with the wash liquid sprayed from the nozzles $m^1$. This and the change in direction of their course serves to throw out a portion of the impurities. On passing between the vanes coated with the film of water, said vanes being constructed and arranged as described in connection with Fig. 1, an appreciable recovery of power results, by virtue of certain vanes being set back with respect to the others and having their convexity, opposite to that of the latter, as has been set forth in my aforesaid patent. The matter, such as dust and other impurities together with the wash liquid which is hurled into the outer or dust zone of the drum is then deflected in a direction substantially opposite to the course of the gases, in a thin sheet or stream, by means of the narrow outer vanes or blades, $q$, alone or conjointly with the stream of wash liquid, which is projected from the nozzles or injectors, $m$, for this purpose. Since the power consumed for conveying the impurities out of the apparatus in the direction indicated is a function of the surface of the blades, $q$, and may be taken as approximately proportional to such surface, it will be understood that a considerable saving of power results in arranging these blades in the outer dust zone, which permits of making them very narrow consistent with an effective removal of impurities.

In the modification represented in Fig. 4 the centrifugal action is in part imparted to the gases by the friction of the disks, $v$, which in this instance are intended to revolve at a very high degree of speed.

The gas inlet, E, and outlet, A, are situated axially, and the annular series of wash liquid injecting nozzles, $w$, are arranged at the delivery end of the casing A, and thus are adapted to deliver a spray into the zone of the peripheral vanes, $q$, which are formed, constructed and arranged as in Figs. 1 to 3. In this case again the travel of the impurities is in a direction substantially opposite to that of the general direction of the gases.

In the form of device represented in the upper half of Fig. 4, the disks, $v$, $v$, are mounted on a central conical diaphragm, Y, having inlet openings, $y$ between the disks, $v$, $v$, said openings, $y$, being flanged outwardly or upwardly into the drum or casing, as shown, the upper edges of the flanges being all substantially equidistant from the axis of the apparatus, said flanges extending only a part of the distance into the casing, however. The disks, $v$, $v$, $v$, are provided with openings, $z$, adjoining the diaphragm, Y. These disks are intersected by the longitudinal blades, $l$. By this arrangement the gases entering at E and passing into the interior of the casing through the openings, $y$, are caused to describe an undulating tortuous course, whose general direction, however, is longitudinal, as indicated by the arrows. Hereby and by the centrifugal action of the disks, they are freed from the heavier particles and impurities as described hereinabove. In this apparatus again the peripheral vanes, $q$ act to sweep the impurities collecting in the narrow dust zone, out of the drum in a direction substantially opposite to the general course of the gases, and this action is preferably assisted by the water spraying nozzles $w$, arranged in line with the helical vanes. $q$, as set forth in connection with Fig. 1. In this construction the blades $q$ and $l$ are inclined in the same manner as described in connection with the form of apparatus shown in Figs. 1 and 2.

In the form of apparatus shown in the lower half of Fig. 4 the undulating course is imparted to the gases by a somewhat different arrangement of disks $v^1$, $v^1$, $v^1$, and partitions or baffles, $x$, $x$, $x$, which extend to the peripheral vanes, $q$, but stop short some distance from the axis, where they are bent over as shown, so as to form openings, $y^1$ and $z^1$, with the disks $v^1$. The gases follow the path indicated by the arrows. There is, in this instance, one stream of gas flowing "in series," while in the construction represented in the upper half of this figure a number of streams of gases are flowing through the casing "in multiple." In other respects, the two constructions are identical. In these constructions also the impurities are swept backward into an annular space, r, where they are discharged in any suitable and convenient manner.

In Fig. 5, another modification embodying my invention is shown, which modification is broadly the same as the form illustrated in Fig. 1, except in the following particulars. There is an annular wash liquid injector, W, m, only at the outlet end of the casing and so arranged as to throw the liquid longitudinally into and through the peripheral or outer dust-zone. In the form of construction shown in the upper half of this figure, the vanes for imparting centrifugal action to the gases are shown at o, o, and p, p and they are mounted on disks, s, s, and t, t, respectively, which disks are keyed to the rotatable shaft I. The triangular vanes, o, o, are only large enough to occupy the outer portion of the casing toward the periphery, while the vanes, p occupy substantially the entire space from the center to the periphery. These vanes o and p, are preferably curved as shown in Fig. 5ª and set back with relation to each other as shown in Fig. 5ᵇ. This cutting away of the vanes o, together with the axial openings, s¹, in the disks, s, and the openings, t¹, between the disks, t, and the periphery of the casing has the purpose of forcing the gases to flow toward the center in each alternate compartment, whence it undergoes further centrifugal action on coming into contact with the blades.

The form of construction represented in the lower half of Fig. 5, is substantially the same as that just described, except that the compartments containing the vanes corresponding to the vanes p, p of the upper half of said figure are subdivided by additional disks, t², t², to which a series of vanes, p¹, p¹ are secured, said vanes extending to both sides of the disks and having a space or slot between them, as shown. The operation of this modification is, in substance, the same as that in the forms already described. The repeated abrupt changes in direction which the gases, entering at E undergo, in combination with the centrifugal action imparted to them by the vanes, causes the impurities to be thrown out of suspension, and they, by virtue of their greater specific gravity, are thrown in the major proportion into the outer dust-zone of the drum or casing, as indicated in the drawing. Here the impurities are swept in a direction opposite to the general direction of the gases, which is longitudinal as before, by the vanes, q, curved as already decribed in connection with Figs. 1 to 3, that is, so as to incline oppositely thereto with respect to an axial direction. It is preferred also to combine these vanes, q, with the water or wash-liquid injectors, W, m, which throw a spray of liquid into the outer dust zone in an axial direction opposite to the general direction of the gases, thus coöperating with said blades, q, for this purpose. These impurities, with or without water, collect in the annular space, r, at the right of the casing, whence they leave the machine through a suitable outlet, n², at the bottom of said casing as shown, being, if desired assisted in this action by suitable exhausting apparatus, as will be readily understood.

Figs. 6 and 7 show an apparatus under this invention which is substantially the form disclosed in Fig. 4, slightly modified. The modification resides in the mode of attachment of the peripheral vanes or blades, q to the disks. This consists in the arrangement, at suitable intervals, of bent angle-irons, v², deflected from a radial direction and riveted to the disks, v, as shown. The free arms or flanges, v³, of the angle-irons v² form further driving means for the gases, and if the direction of rotation of the disks, v, is that indicated by the large arrow in Fig. 7, it will be readily understood that the centrifugal action imparted to the gases will be greatly increased by the radial component of the action of said flanges, v³, as indicated by the small arrows in Fig. 7. The peripheral blades or vanes, q, so curved or inclined as to force the impurities in a direction opposite to the general course taken by the gases, are arranged between the ends of adjacent angle irons, v², as shown, and are riveted with their ends to the said ends of the angle irons, which extend beyond the disks, v, into the narrow annular peripheral space, adjoining the inner surface of the drum, D, all as shown in Figs. 6 and 7.

The modified structure illustrated in Figs. 8 to 13 inclusive differs from that shown in Fig. 5 only in some details of construction. The vanes o¹ and p¹ have a curvature radially and circumferentially as best shown in Figs. 11, 12 and 13. These vanes, as best seen in Figs. 11 and 12, are deflected somewhat from a radial direction. The peripheral blades or vanes, q, as best seen in Figs. 11 and 13 are preferably bent over at their edges near the inner surface of the drum, but not necessarily so, the essential fact being that their curvature and direction is such that the impurities collecting in the peripheral zone will be swept forward in a direction opposite to the general course taken by the gases. The arrangement of the blades or vanes, o¹ and p¹, as here shown permits a recovering of energy and hence economy in power in a manner substantially equivalent to that in the device represented in Fig. 1.

As to the lower half of Fig. 8, the only point in which the construction there shown differs from that illustrated in the lower half of Fig. 5, is that the number of intermediate disks, $t^3$, $t^3$, is increased, these disks being arranged with their upper and lower edges in an oblique line, so as to facilitate the passage of the gases into the inter spaces. The transverse vanes are here absent, moreover.

The mode of operation, not differing essentially from that described in connection with Fig. 5, need not here be recited.

What I claim and desire to secure by Letters Patent is:—

1. In a gas purifier, a drum and a series of rotary blades arranged to force the gases forward longitudinally in the drum, in combination with a series of blades arranged to rotate with the first series of rotary blades arranged in the peripheral zone of the drum and so shaped as to positively force the matter there accumulating in a direction opposite to the general course taken by the gases.

2. In a gas purifier, a drum provided with an inlet and an outlet at opposite ends, and a series of revolving blades arranged and adapted to cause the gas to travel longitudinally of the drum, in combination with exterior peripheral blades adapted to revolve with the first series of blades, and having an inclination with respect to the axis of the drum, so as to force the matter accumulating in the outlet peripheral zone in a direction opposite to the general course of the gases.

3. In a gas purifier, the combination with a drum having an inlet and an outlet at opposite ends, of a series of rotary gas conveying longitudinal blades adapted to cause the gas to travel longitudinally of the drum, each blade being inclined with respect to the axis of the drum and a series of exterior peripheral blades oppositely inclined with respect to the axis and fixed with relation to the first named blades.

4. In a gas purifier, the combination with a drum having an inlet and an outlet at opposite ends, of a series of rotary gas conveying longitudinal blades adapted to cause the gas to travel longitudinally of the drum, each blade being inclined with respect to the axis of the drum, and a series of exterior peripheral blades oppositely inclined and fixed with relation to the first named blades, said peripheral blades being narrower than the gas conveying blades.

5. In a gas purifier, a drum having an inlet and an outlet at opposite ends, in combination with a series of rotary helical blades or vanes running lengthwise of the drum and adapted to cause the gas to travel longitudinally of said drum, and a series of exterior peripheral oppositely inclined helical blades fixed with relation to the first series of blades.

6. In a gas purifier, a drum having an inlet and an outlet at opposite ends, in combination with a series of rotary helical blades or vanes running lengthwise of the drum and adapted to cause the gas to travel longitudinally of said drum, and a series of outer and narrower oppositely inclined helical blades or vanes, fixed with relation to the first series of blades.

7. In a gas purifier, a drum having an inlet and an outlet at opposite ends, in combination with a series of rotary longitudinal gas conveying vanes inclined with respect to the axis of the drum and adapted to cause the gas to travel longitudinally of said drum, a series of outer oppositely inclined blades or vanes fixed with relation to the first series of blades, and a liquid injecting device in line with each series of blades or vanes and adapted to inject wash liquid in the direction of the thrust of the respective series of vanes.

8. In a gas purifier, a drum having an outlet and an inlet at opposite ends, in combination with a series of rotary longitudinal gas conveying vanes, inclined with respect to the axis of the drum and adapted to cause the gas to travel longitudinally of said drum, an outer rotary series of dust expelling vanes oppositely inclined to the first series arranged to rotate with the same, and a liquid injecting device in line with the outer vanes.

9. In a gas purifier, a series of longitudinal vanes secured to a rotary shaft, in combination with a series of peripheral vanes secured to the outside of the longitudinal vanes, the peripheral vanes being inclined with respect to the longitudinal vanes.

In testimony whereof I hereunto affix my signature in the presence of two witnesses.

CARL FLÖSSEL.

Witnesses:
META FLÖSSEL.
LOUIS MUELLER.